US007229657B2

(12) United States Patent
Woelfel et al.

(10) Patent No.: US 7,229,657 B2
(45) Date of Patent: Jun. 12, 2007

(54) DULCE DE LECHE-FLAVORED FAT-BASED CONFECTION, METHOD FOR MAKING THE SAME AND CONFECTIONERY CANDIES MAKING USE OF THE SAME

(75) Inventors: Keith A. Woelfel, Randolph, NJ (US); Amy M. Dombroski, Stanhope, NJ (US); Bill J. Bellody, Hackettstown, NJ (US); John Didzbalis, Cranford, NJ (US); Caroline E. Chaney, Bethlehem, PA (US)

(73) Assignee: Mars Incorporated, McLean, VA (US)

( * ) Notice: Subject to any disclaimer, the term of this patent is extended or adjusted under 35 U.S.C. 154(b) by 212 days.

(21) Appl. No.: 10/198,883

(22) Filed: Jul. 19, 2002

(65) Prior Publication Data

US 2003/0031771 A1    Feb. 13, 2003

Related U.S. Application Data

(60) Provisional application No. 60/306,955, filed on Jul. 20, 2002.

(51) Int. Cl.
*A23L 1/22*     (2006.01)
(52) U.S. Cl. ............... 426/534; 426/520; 426/524; 426/580; 426/601; 426/660
(58) Field of Classification Search ............ 426/520, 426/524, 534, 580, 601, 658, 660
See application file for complete search history.

(56) References Cited

U.S. PATENT DOCUMENTS

| | | | | |
|---|---|---|---|---|
| 2,558,528 | A | 6/1951 | Sharp | 99/55 |
| 4,318,855 | A | 3/1982 | Huber et al. | 260/343.6 |
| 4,384,144 | A | 5/1983 | Shono et al. | 568/347 |
| 4,428,886 | A | 1/1984 | Huber et al. | 260/464 |
| 4,892,966 | A | 1/1990 | Wild | 560/174 |
| 4,927,645 | A | 5/1990 | Lee | 426/93 |
| 5,344,664 | A | 9/1994 | Fitch et al. | 426/631 |
| 5,384,148 | A | 1/1995 | Lynch et al. | 426/632 |
| 5,591,474 | A | 1/1997 | Miller | 426/580 |
| 5,919,502 | A | 7/1999 | Manez et al. | 426/93 |
| 6,083,539 | A | 7/2000 | Yamada et al. | 426/28 |
| 6,316,039 | B1 | 11/2001 | Heyland | 426/533 |
| 6,465,032 | B1 * | 10/2002 | Hollar | 426/506 |
| 2002/0114869 | A1 | 8/2002 | Cravero | 426/103 |

FOREIGN PATENT DOCUMENTS

| | | |
|---|---|---|
| BE | 461621 | 1/1946 |
| CH | 643 228 | 5/1984 |
| CH | 644 837 | 8/1984 |
| DE | 31 22 672 | 12/1982 |
| DE | 100 05 374 | 8/2001 |
| EP | 0 564 077 | 10/1993 |
| EP | 0 600 701 | 6/1994 |
| EP | 0 925 725 | 6/1999 |
| EP | 0 966 885 | 12/1999 |
| EP | 0 986 959 | 3/2000 |
| EP | 1 002 463 | 5/2000 |
| EP | 1 031 285 | 8/2000 |
| FR | 373747 | 5/1907 |
| FR | 556927 | 7/1923 |
| FR | 782478 | 6/1935 |
| FR | 1068489 | 1/1954 |
| GB | 1196380 | 6/1970 |
| JP | 58-203951 | 11/1983 |
| WO | 96/33619 | 10/1996 |
| WO | 02/49452 | 6/2002 |

OTHER PUBLICATIONS

B. Minifie, Chocolate, Cocoa, and Confectionery: Science and Technology, 3d ed., Chapman & Hall, New York, 506, 530-531 (1989).
Abstract for G. Souza, et al., "Preliminary Studies on Production of Caramelized Condens d Milk (Doce de Leite) from a Milk/Soya Mixture", Boletin do Instituto de Tecnologia de Alimentos, vol. 16, No. 1, pp. 35-40 (1979)(Database FSTA/IFIS accession No. 81-1-01-p0029, abstract No. XP002217589).
Patent Abstracts of Japan, vol. 8, No. 46 (C-212), Feb. 29, 1984 (corresponds to JP 58-203951).
Database WPI, Section Ch, W ek 197537, Derwent Publications Ltd., London, abstract No. 1975-61531W, XP002231959 (corresponds to JP 50-025018).

* cited by examiner

*Primary Examiner*—Leslie Wong
(74) *Attorney, Agent, or Firm*—Fitzpatrick, Cella, Harper & Scinto

(57) ABSTRACT

A dulce-flavored fat-based confection possessing a smooth and creamy mouthfeel and a thermally generated flavor and suitable for use in candy-shelling is provided. A method of making such a dulce-flavored fat-based confection is also disclosed.

11 Claims, No Drawings

DULCE DE LECHE-FLAVORED FAT-BASED CONFECTION, METHOD FOR MAKING THE SAME AND CONFECTIONERY CANDIES MAKING USE OF THE SAME

This application claims the benefit of U.S. Provisional Application No. 60/306,955, filed Jul. 20, 2002.

BACKGROUND OF THE INVENTION

1. Field of the Invention

The present invention relates to a novel fat-based confection having a smooth and creamy mouthfeel and a thermally generated dulce de leche flavor. This invention further relates to a method of making such a dulce de leche-flavored fat-based confection, as well as to confectionery candies incorporating such a dulce de leche-flavored fat-based confection, in particular, candy-shelled confectionery candies.

2. Description of Related Art

Dulce de leche (hereinafter "dulce de leche" or "dulce"), translated from Spanish as "sweet of milk", is a popular treat in South and Central American countries. Dulce de leche is typically made by boiling sweetened condensed milk for hours to produce a sweet, caramelized pudding-like treat, which can be eaten alone or in combination with a biscuit or wafer. Dulce de leche is a water-based composition characterized by a smooth and creamy texture and a distinct rich dairy flavor with lower caramelized sugar notes. The flavor of dulce de leche is thermally generated. Dulce de leche is also known as carjeta (Mexico), arequipe (Colombia), fanqulla (Cuba) and manjar blanco (Peru).

It is known to incorporate water-based dulce de leche or dulce de leche-like compositions into certain products. For example, Haagen Das Dulce De Leche ice cream and Alfajore cookies do just that. In addition, dulce de leche spreads such as La Salamandra and Smucker's spreads are known. All known dulce de leche products contain water-based dulce de leche compositions. Typically, dulce de leche compositions contain high moisture contents, i.e., about 26% moisture by weight, and exhibit a water activity of about 0.85.

Both the high moisture content and water activity of dulce de leche impose limits on the types and quality of products which can be made using it. For example, the incorporation of water-based dulce de leche into certain applications such as candy-shelled confections is problematic. In short, dulce de leche is typically too soft to candy shell or at the very least is very difficult to process. In this same regard, water-based dulce de leche can be difficult to form in a bite-size format. Special process conditions are required, which drive up manufacturing costs and complexity. Temperature and humidity must be carefully controlled to process on traditional depositing or Open Extrusion center forming equipment. Traditional water-based dulce de leche loses its shape during processing.

Additionally, the high moisture content of water-based dulce de leche creates a moisture gradient when mixed with low moisture components such as crisp rice, biscuits, cookies, etc. Controlling this gradient can be difficult, often requiring a more complex product design that relies on the application of moisture barriers and humectants to slow the movement of water into the lower moisture components. Shortened product shelf-life, poor texture and quality are often the result.

It should also be noted that traditional water-based caramels suffer from the same inadequacies as water-based dulce de leche in certain applications. This, again, is due to a relatively high moisture content, i.e., about 5.0%–12.0% moisture by weight and a water activity ranging from about 0.40 to 0.50. Softer traditional water-based caramels have the same problems as dulce de leche, often being too soft to form in bite-size pieces or to candy shell. Further, traditional water-based caramels give a hard, chewy, unpleasant eating experience when candy-shelled and are too slow to clear the mouth upon consumption; in other words, bits of caramel and candy shell stick to the consumer's teeth, resulting in an unfavorable overall eating experience. Water-based caramels also create problematic moisture gradients as described above. In the end, however, the inadequacies of water-based caramel are irrelevant; water based caramel could never be a substitute for dulce de leche because caramels have a very different flavor characterized by caramelized sugar, vanilla and buttery notes.

Clearly, there is a need to develop a dulce de leche composition which does not suffer from the above-noted inadequacies of water-based dulce de leche. Such a dulce de leche product should offer the same rich dairy flavor as water-based dulce de leche, but offer a much greater degree of product design freedom, improved shelf-life, better texture and simple processing.

Caramac® (Nestle®) is a fat-based "caramel flavour covering" which is used to enrobe a biscuit in Nestle®'s BreakAway, which is sold in the United Kingdom. Caramac® is also marketed as a simple solid bar in Nestle®'s Caramac®. As set forth in the ingredient declaration, Caramac® comprises vegetable fat, sugar, lactose, sweetened condensed skimmed milk, skimmed milk powder, butter, emulsifier (lecithin), treacle, salt, flavoring, and possibly nut traces. Caramac® has a flavor intensity much lower than that of conventional dulce de leche. More importantly, the flavor of Caramac® is more similar to a traditional caramel flavor than to a dulce de leche flavor. It is believed that the caramel-like flavor of the fat-based Caramac® can be solely attributed to the inclusion of treacle, a.k.a, molasses, in the composition. In other words, Caramac® does not appear to have a thermally generated flavor. What is more, Caramac® can be described as having a waxy mouthfeel.

Hence, there is clearly a need to develop a composition having a distinct thermally generated dulce de leche flavor, a smooth, creamy texture and a very low moisture content. The applications for such a composition would be manifold.

SUMMARY OF THE INVENTION

The present invention is directed to a dulce de leche-flavored fat-based confection comprising a sweetener, a dairy protein and a fat continuous phase, made according to a process comprising the steps of dispersing the sweetener and the dairy protein in a fat to form a raw confection having the fat continuous phase; heating the raw confection within a temperature range and for a time sufficient to thermally generate dulce de leche flavor, thereby forming the dulce de leche-flavored fat-based confection; and cooling the dulce de leche-flavored fat-based confection to a temperature sufficient to halt the thermal generation of dulce de leche flavor.

The present invention is also directed to a method of making a dulce de leche-flavored fat-based confection comprising the steps of dispersing a sweetener and a dairy protein in a fat to form a raw confection having a fat continuous phase; heating the raw confection within a temperature range and for a time sufficient to thermally generate a dulce de leche flavor, thereby forming the dulce de leche-flavored fat-based confection; and cooling the dulce de leche-flavored fat-based confection to a temperature sufficient to halt the thermal generation of dulce de leche flavor.

In certain preferred embodiments of the method, there is an additional particle size reduction step either before or after the heating step. The average particle size is reduced to 1.0 to 100.0 microns. In certain preferred embodiments of the method, the raw confection is heated within a temperature range between 70° C. and 180° C. In certain preferred embodiments, the time sufficient to develop a dulce de leche flavor is between 1 minute and 1440 minutes. In certain preferred embodiments, the temperature sufficient to halt the development of dulce de leche flavor is below 70° C.

In certain preferred embodiments of the invention, the confection produced has a water activity ranging from 0.09 to 0.38. In certain preferred embodiments of the invention, moisture is present in an amount ranging from 0.10% to 5.0% by weight of the confection. In additional preferred embodiments of the present invention, the confection comprises a fat in an amount ranging from 10.0% to 98.0% by weight or a sweetener in an amount ranging from 1.0% to 80.0% by weight or a dairy protein in an amount ranging from 0.5% to 40.0% by weight of the confection.

The present invention is broadly directed to a dulce de leche-flavored fat-based confection.

The present invention is further directed to a dulce de leche-flavored fat-based confection comprising a sweetener, a dairy protein and a fat continuous phase. In preferred embodiments, the sweetener is selected from fructose, sucrose, lactose, dextrose, polyols, other natural and artificial sweeteners and combinations thereof. In certain preferred embodiments, the dairy protein is selected from non-fat dry milk, demineralized whey powder, whole milk powder and combinations thereof.

In certain preferred embodiments, the fat continuous phase is selected from fractionated palm kernel oil, cocoa butter, anhydrous milk fat, hydrogenated vegetable oil, and combinations thereof.

The present invention is additionally directed to a confection, preferably a candy-shelled confection, or a chocolate composition comprising a dulce de leche-flavored fat-based confection.

The present invention is also directed to a fat-based confection comprising 2-hydroxy-3-methyl-2-cyclopenten-1-one as a flavor component. In preferred embodiments of the present invention, the fat-based confection contains an additional flavor component or additional flavor components. These flavor components are 2-acetyl furan, 2-acetyl-3-hydroxyfuran, methyl furanoate, 2,5-dimethyl-4-hydroxy-3-(2H) furanone, 3-hydroxy-2-methyl-pyran-4-one, 2-furfural, 2-(5H)furanone, 2-furfuryl alcohol, dihydro hydroxy maltol and 5-hydroxymethyl furfural.

DETAILED DESCRIPTION OF THE PREFERRED EMBODIMENTS

The present invention relates to a novel dulce de leche-flavored fat-based confection. This confection is preferably thermally processed to create special textural and flavor attributes. The inventive dulce de leche-flavored confection has a fat-based continuous phase that imparts a distinctive mouthfeel and eating experience. The creaminess of the fat-based confection enhances consumer perception of quality and overall acceptance of a finished candy using such a confection. The dulce de leche-flavored fat-based confection of the present invention solves the problems associated with traditional water-based dulce de leche, while maintaining a true thermally generated dulce de leche flavor. In sum, by virtue of an ultra-low moisture content, a low water activity and a fat continuous phase, the dulce de leche-flavored fat-based confection of the present invention offers a great degree of product design freedom, improved shelf-life, better texture and simple processing.

As used herein, the term "dulce de leche flavor" refers to a flavor characterized by a dairy main flavor with lower caramelized sugar flavor typically formed through thermal generation. As used herein, the term "dulce de leche-flavored" refers to a material having a dulce de leche flavor. As used herein, "fat-based" refers to a material having a fat/lipid continuous phase in which material components such as milk proteins and sugars are dispersed. As used herein, "water-based" refers to a material having a water continuous phase in which material components such as milk proteins and sugars are dispersed; typically water-based materials have a water activity from about 0.4 to about 0.5 and a moisture content of about 5% to about 12%. As used herein, "candy-shelled" refers to a composition having a sugar shell made by panning as known to those skilled in the art. As used herein, "dairy protein" refers to any protein derived from a dairy source; the dairy protein may be purified and/or processed and may be in the whey or casein class of milk proteins. As used herein, "sweetener" refers to any composition which provides sweetness and/or serves as a browning or reducing sugar. As used herein, "Maillard reaction" refers to a well-known food reaction which occurs between an amino source such as a dairy protein and a reducing sugar.

In a first aspect, the present invention is directed to a method of making a dulce de leche-flavored fat-based confection. In the first step, a sweetener and a dairy protein are dispersed in a fat to form a raw confection having a fat continuous phase. Dispersion is accomplished in any manner suitable to form a homogeneous dispersion, such as, for example, a Littleford Day M-5 Mixer (Littleford Day, Florence, Ky.) or a Hobart A-200FT Mixer (Hobart Corp., Troy, Ohio). Typically, dispersion is accomplished under low heat, i.e., 35–50° C., and with agitation, as it is necessary to keep the fat(s) liquid during the dispersion step. However, any method or equipment which keeps the fat(s) liquid can be employed herein.

It is important to note that since many ingredients will inherently contain water at 5% or greater, ingredients must be carefully selected to keep the overall moisture content less than about 5%, and preferably less than about 1.5%, i.e., low moisture ingredients (less than about 5% moisture) are preferably employed. For example, if dextrose is used as a sweetener, it would need to be anhydrous dextrose, not dextrose monohydrate. Typically, commercially purchased dextrose is dextrose monohydrate, which has a substantially higher moisture content than anhydrous dextrose.

Generally, any sweetener is suitable for use in this invention as long as it has a low moisture content. Exemplary sweeteners include, without limitation and in their low moisture form if applicable, sucrose, lactose, dextrose, polyols, other natural and artificial sweeteners and combinations thereof. In a preferred embodiment of the present invention, the sweetener is a sugar such as fructose, sucrose, lactose or dextrose. One of ordinary skill in this art will readily appreciate that the above-described sweetener may not only provide sweetness to the dulce de leche-flavored fat-based confection, but in some instances may also serve as the browning or reducing sugar necessary to develop dulce de leche flavor. In certain preferred embodiments of this invention, the dulce de leche-flavored fat-based confection comprises a sweetener in an amount ranging from 1.0% to 80.0%, preferably 5.0% to 70.0%, more preferably 10.0% to 60.0%, still more preferably 15.0% to 55.0%, and most preferably 25.0% to 50.0%, by weight of the dulce de leche-flavored fat-based confection.

Likewise, any dairy protein is suitable for use in the present invention as long as it has a low moisture. Exemplary dairy proteins include, without limitation and in their low moisture form if applicable, non-fat dry milk, demineralized whey powder, whole milk powder and combinations thereof. It is also believed that soy protein could be used in place of dairy protein if so desired. One of ordinary skill in this art will readily appreciate that certain sugars may be present in the above-described dairy protein; these sugars may provide some degree of sweetness to the dulce de leche-flavored fat-based confection, as well as serve as the browning or reducing sugar necessary to develop dulce de leche flavor. In certain preferred embodiments of this invention, the dulce de leche-flavored fat-based confection comprises a dairy protein in an amount ranging from 0.5% to 40.0%, preferably 1.0% to 30.0%, more preferably 2.0% to 20.0%, still more preferably 3.0% to 15.0%, and most preferably 4.0% to 10.0%, by weight of the dulce de leche-flavored fat-based confection.

Similarly, any fat is suitable for use in the present invention as long as it has a low moisture content. Exemplary fats include, without limitation and in their low moisture form if applicable, fractionated palm kernel oil, cocoa butter, anhydrous milk fat (AMF), hydrogenated vegetable oil such as soy fat or cottonseed oil, and combinations thereof. Fractionated palm kernel oil such as that available from Fuji under the name Palkena-SAC, is preferably used in the dulce de leche-flavored fat-based confection. In certain preferred embodiments of this invention, the dulce de leche-flavored fat-based confection comprises a fat in an amount ranging from 10.0% to 98.0%, preferably 16.0% to 85.0%, more preferably 22.0% to 75.0%, still more preferably 25.0% to 60.0%, and most preferably 28.0% to 45.0%, by weight of the dulce de leche-flavored fat-based confection.

The particular fat(s) chosen for use in the present invention is primarily responsible for the smooth, creamy mouthfeel of the present inventive dulce de leche-flavored fat-based confection. The fat(s) chosen comprises a continuous matrix which disperses the sweetener and dairy protein. The particular texture of the dulce de leche-flavored fat-based confection obtained can be manipulated by the selection of particular fat(s). Fats with relatively high melting points give a greater degree of heat stability; conversely, fats with relatively low melting points give a softer texture. According to the present invention, fat(s) with a melting point in the range of about 30° C. to about 34° C. is preferably used, especially when the dulce de leche-flavored fat-based confection will be used in any type of panning process. Likewise, one of ordinary skill in the art would readily appreciate that the use of fat(s) having a higher melting point would give a harder texture.

The texture of the present dulce de leche-flavored fat-based confection can be further controlled by fat type, fat content, dairy protein type, dairy protein content, sweetener type, sweetener content and particle size. In that regard, in an optional step of the present inventive method, the raw confection can be ground (refined) to obtain a desired average particle size. The desired average particle size ranges from 1.0 to 100.0 microns, preferably 5.0 to 75.0, more preferably 10.0 to 50.0, still more preferably 15.0 to 40.0, and most preferably 20.0 to 35.0 microns. Grinding can be accomplished using any conventional means such as a roller refiner or a ball mill or any other means known in the art. The average particle size of the raw confection prior to size reduction will depend upon the particular sweetener and dairy protein employed; typically this will range anywhere from about 80 microns and up. One of ordinary skill in this art will readily appreciate that such a size reduction step could alternatively be conducted prior to the above-described dispersion step, i.e., size reduction of ingredients, or even after the thermal processing step described below.

One of ordinary skill in this art will also readily understand that other ingredients may and will be present in a given dulce de leche-flavored fat-based confection, in addition to the sweetener, dairy protein and fat described above. Other such ingredients include, without limitation, emulsifiers such as mono and diglycerides, salt and stabilizers such as disodium phosphate.

In a second step of the process of making the dulce de leche-flavored fat-based confection of the present invention, the raw confection is heated within a temperature range and for a time sufficient to thermally generate a dulce de leche flavor, thereby forming the dulce de leche-flavored fat-based confection. This heating step can be conducted in any scraped surface heat exchanger such as, for example, a Contherm scraped-surface heat exchanger (Alfa Laval Thermal Inc., Newburyport, Mass.). The temperature must be raised to a temperature sufficient to initiate flavor development reactions such as the Maillard reaction; likewise, the temperature must be maintained at a temperature and for a time sufficient to conduct such reactions, yet without developing undesirable flavors.

Typically, the raw confection is heated within a temperature range from 70° C. to 180° C., preferably 75° C. to 165° C., more preferably 80° C. to 150° C., still more preferably 90° C. to 135° C., and most preferably 100° C.-125° C. Temperatures higher than these will impart scorch notes to the dulce de leche-flavored fat-based confection; temperatures lower than these are insufficient to initiate the requisite flavor development reactions such as the Maillard reaction. Typically, the time sufficient to develop a dulce de leche flavor ranges from 1 to 1440 minutes, preferably 2 to 720 minutes, more preferably 3 to 600 minutes, still more preferably 5 to 480 minutes, and most preferably 10 to 120 minutes. Times longer than these will impart scorch notes to the dulce de leche-flavored fat-based confection; times shorter than these will be inadequate to allow dulce de leche flavor to develop. For purposes of the present invention, one of ordinary skill in this art will readily appreciate that the higher the temperature, the lower the time and vice versa. Confirmation of the formation of the desired dulce de leche-flavored fat-based confection is typically made by sensory evaluation, analytical evaluation or combination thereof.

In a final step of the present inventive process, the dulce de leche-flavored fat-based confection is cooled to a temperature sufficient to halt the development of dulce de leche flavor. It is also understood that further cooling may be undertaken in order to develop an appropriate fat crystal structure for a given end use. Typically, a temperature below 70° C. is suitable for halting flavor development.

The dulce de leche-flavored fat-based confection made according to the above-described method has an ultra-low moisture content and low water activity. In certain preferred embodiments of this invention, moisture is present in an amount ranging from 0.1% to 5.0%, preferably 0.15% to 3.50%, more preferably 0.20% to 2.50%, still more preferably 0.25% to 1.50%, further preferably 0.30% to 1.25%, and most preferably 0.5% to 0.9%, by weight of the dulce de leche-flavored fat-based confection. In certain preferred embodiments of this invention, the dulce de leche-flavored fat-based confection has a water activity (Aw) ranging from 0.09 to 0.38, preferably 0.10 to 0.36, more preferably 0.11 to 0.34, still more preferably 0.12 to 0.30, and most preferably 0.13 to 0.25.

If the dulce de leche-flavored fat-based confection contains a higher amount of moisture than that noted above, the sweetener and dairy protein will come out of the fat continuous phase upon heating the raw confection; in fact, the characteristics of the dulce de leche-flavored fat-based confection will change dramatically, becoming unstable and quite brittle. The texture is no longer smooth and creamy, but quite the opposite. A discontinuous, severely grained texture forms that is composed of many hard inclusions with large quantities of fat oiling off the mass. A gentle heating process as described above, in combination with low moisture ingredients, maintains the creaminess of the present dulce de leche-flavored fat-based confection. During processing, heating and agitation are carefully controlled to prevent localized hot spots from occurring in the dulce de leche-flavored fat-based confection.

The present invention also contemplates a process wherein dulce de leche flavor is thermally generated via a sweetener and/or a dairy protein before their dispersion in a fat continuous phase. Any process by which dulce de leche flavor is thermally generated using the above-noted ingredients is within the scope of the present invention.

In a second aspect, the present invention is directed to a dulce de leche-flavored fat-based confection comprising a sweetener, a dairy protein and a fat continuous phase made according to the above-described process.

In a third aspect, the present invention is directed to a dulce de leche-flavored fat-based confection. In other words, the present invention is broadly directed to any fat-based confection which has a dulce de leche flavor as defined above. In certain preferred embodiments, the dulce de leche-flavored fat-based confection includes a sweetener in an amount and/or type noted above, includes a dairy protein in an amount and/or type noted above, and/or includes a fat in an amount and/or type noted above. Further, in certain preferred embodiments, the dulce de leche-flavored fat-based confection of the present invention has a water activity as noted above and/or a moisture content as noted above.

Given the extremely low moisture content of the above-described inventive dulce de leche-flavored fat-based confection, it is particularly suited for application to products in which an unacceptable moisture gradient would typically be present if one were using a water-based composition such as a traditional caramel or dulce de leche. When using the present dulce de leche-flavored fat-based confection in conjunction with cookies, crisp rice, crackers, etc., no moisture gradient is created; this allows for a platform of products comprising dry components combined with the dulce de leche-flavored fat-based confection which will not become soggy during shelf-life. The dulce de leche-flavored fat-based confection of the present invention can even be used as a barrier coating. What is more, the present dulce de leche-flavored fat-based confection is particularly suited for use in a candy-shelled confection. The dulce de leche-flavored fat-based confection allows for the formation of a bite-size piece, and the surface of the dulce de leche-flavored fat-based confection is stable to sugar-shelling, i.e., sugar shell will adhere.

Hence, another aspect of the present invention is directed to confections comprising the dulce de leche-flavored fat-based confection of the present invention, and, in particular, to a candy-shelled confection comprising the dulce de leche-flavored fat-based confection. It is important to note that the dulce de leche-flavored fat-based confection of the present invention can also be used as a stand alone product, e.g., in tablet form, as an inclusion, as an enrobing material, etc.

Further, the inventive dulce de leche-flavored fat-based confection can also be used as an intermediate in the manufacture of chocolate. Both SOI (standard of identity) and non-SOI chocolate is included for purposes of the present invention. In fact, using the dulce de leche-flavored fat-based confection of the present invention as an intermediate to generate developed milk notes in chocolate allows for bypass of the complicated, expensive and cumbersome crumb oven process. The crumb process generates desirable developed milk flavors for chocolate through, for example, the Maillard reaction between milk proteins and sugar to impart a flavor. Generally, fluid milk is condensed and mixed with sugar and cocoa liquor; the mixture is dried in large ovens at 75° C. to 105° C. for 4 to 8 hours until the moisture content is under 1%. Details of the crumb oven process can be found in Chocolate, Cocoa, and Confectionery by Bernard Minifie.

The cooking process used in the present dulce de leche-flavored fat-based confection creates, inter alia, an array of developed milk flavors associated with chocolate processed using the crumb oven. In short, the sugar and protein sources of the present invention can be modified to produce an array of developed milk and dairy-like flavors for chocolate. Accordingly, an additional aspect of the present invention is directed to a chocolate composition which contains the dulce de leche-flavored fat-based confection of the present invention; one of ordinary skill in this art would readily appreciate that other ingredients typically present in chocolate compositions would also be present in the chocolate composition of the present invention.

Yet another aspect of the present invention is directed to a dulce de leche-flavored fat-based confection comprising a sweetener, a dairy protein and a fat continuous phase. All of the details given above with respect to sweetener identity and amount, dairy protein and amount, fat continuous phase identity and amount, water activity, moisture content and flavor are the same for this aspect.

Yet another aspect of the present invention is directed to a fat-based confection comprising 2-hydroxy-3-methyl-2-cyclopenten-1-one as a flavor component. As used herein, "flavor component" refers to a flavor compound or a compound which provides flavor to a confection. According to the present invention, the overall flavor profile is preferably a result of thermally generated flavor components.

In preferred embodiments of the present invention, the fat-based confection contains an additional flavor component or additional flavor components. These flavor components are 2-acetyl furan, 2-acetyl-3-hydroxyfuran, methyl furanoate, 2,5-dimethyl-4-hydroxy-3-(2H) furanone, 3-hydroxy-2-methyl-pyran-4-one, 2-furfural, 2-(5H)furanone, 2-furfuryl alcohol, dihydro hydroxy maltol and 5-hydroxymethyl furfural. Analysis of the fat-based confection of the present invention has shown these flavor compounds to be key in producing a dulce de leche flavor; hence, "dulce de leche flavor" can be more specifically defined as flavor created by some combination of these flavor components. All of the details given above for the first aspect of this invention with respect to sweetener identity and amount, dairy protein and amount, fat continuous phase identity and amount, water activity and moisture content are the same for this aspect.

In certain embodiments of the present invention, 2-hydroxy-3-methyl-2-cyclopenten-1-one is present in an amount greater than or equal to 0.001 ppm, preferably greater than or equal to 0.004 ppm, more preferably greater than or equal to 0.007 ppm, still more preferably greater than or equal to 0.010 ppm, further preferably greater than or equal to 0.013 ppm, and most preferably greater than or equal to 0.016 ppm. In certain embodiments of the present invention, 2-hydroxy-3-methyl-2-cyclopenten-1-one is present in an amount ranging from 0.001 ppm to 30.0 ppm, preferably 0.004 ppm to 25.0 ppm, more preferably 0.007 ppm to 20.0 ppm, still more preferably 0.010 ppm to 15.0 ppm, further preferably 0.013 ppm to 10.0 ppm, and most preferably 0.016 ppm to 5.0 ppm.

In certain embodiments of the present invention, 2-acetyl furan is present in an amount greater than or equal to 0.001 ppm, preferably greater than or equal to 0.020 ppm, more preferably greater than or equal to 0.040 ppm, still more preferably greater than or equal to 0.060 ppm, further preferably greater than or equal to 0.080 ppm, and most preferably greater than or equal to 0.10 ppm. In certain embodiments of the present invention, 2-acetyl furan is present in an amount ranging from 0.001 ppm to 30.0 ppm, preferably 0.020 ppm to 25.0 ppm, more preferably 0.040 ppm to 20.0 ppm, still more preferably 0.060 ppm to 15.0 ppm, further preferably 0.080 ppm to 10.0 ppm, and most preferably 0.10 ppm to 5.0 ppm.

In certain embodiments of the present invention, 2-acetyl-3-hydroxyfuran (isomalt) is present in an amount greater than or equal to 0.001 ppm, preferably greater than or equal to 0.020 ppm, more preferably greater than or equal to 0.040 ppm, still more preferably greater than or equal to 0.060 ppm, further preferably greater than or equal to 0.080 ppm, and most preferably greater than or equal to 0.10 ppm. In certain embodiments of the present invention, 2-acetyl-3-hydroxyfuran is present in an amount ranging from 0.001 ppm to 250.0 ppm, preferably 0.020 ppm to 200.0 ppm, more preferably 0.040 ppm to 150.0 ppm, still more preferably 0.060 ppm to 100.0 ppm, further preferably 0.080 ppm to 75.0 ppm, and most preferably 0.10 ppm to 50.0 ppm.

In certain embodiments of the present invention, methyl furanoate is present in an amount greater than or equal to 0.001 ppm, preferably greater than or equal to 0.020 ppm, more preferably greater than or equal to 0.040 ppm, still more preferably greater than or equal to 0.060 ppm, further preferably greater than or equal to 0.080 ppm, and most preferably greater than or equal to 0.10 ppm. In certain embodiments of the present invention, methyl furanoate is present in an amount ranging from 0.001 ppm to 60.0 ppm, preferably 0.020 ppm to 50.0 ppm, more preferably 0.040 ppm to 40.0 ppm, still more preferably 0.060 ppm to 30.0 ppm, further preferably 0.080 ppm to 20.0 ppm, and most preferably 0.10 ppm to 10.0 ppm.

In certain embodiments of the present invention, 2,5-dimethyl-4-hydroxy-3-(2H) furanone (furaneol) is present in an amount greater than or equal to 0.15 ppm, preferably greater than or equal to 0.18 ppm, more preferably greater than or equal to 0.21 ppm, still more preferably greater than or equal to 0.24 ppm, further preferably greater than or equal to 0.27 ppm, and most preferably greater than or equal to 0.30 ppm. In certain embodiments of the present invention, 2,5-dimethyl-4-hydroxy-3-(2H) furanone is present in an amount ranging from 0.15 ppm to 120.0 ppm, preferably 0.18 ppm to 100.0 ppm, more preferably 0.21 ppm to 80.0 ppm, still more preferably 0.24 ppm to 60.0 ppm, further preferably 0.27 ppm to 40.0 ppm, and most preferably 0.30 ppm to 20.0 ppm.

In certain embodiments of the present invention, 3-hydroxy-2-methyl-pyran-4-one (maltol) is present in an amount greater than or equal to 5.0 ppm, preferably greater than or equal to 6.0 ppm, more preferably greater than or equal to 7.0 ppm, still more preferably greater than or equal to 8.0 ppm, further preferably greater than or equal to 9.0 ppm, and most preferably greater than or equal to 10.0 ppm. In certain embodiments of the present invention, 3-hydroxy-2-methyl-pyran-4-one is present in an amount ranging from 5.0 ppm to 300.0 ppm, preferably 6.0 ppm to 250.0 ppm, more preferably 7.0 ppm to 200.0 ppm, still more preferably 8.0 ppm to 150.0 ppm, further preferably 9.0 ppm to 100.0 ppm, and most preferably 10.0 ppm to 50.0 ppm.

In certain embodiments of the present invention, 2-furfural is present in an amount greater than or equal to 0.10 ppm, preferably greater than or equal to 0.15 ppm, more preferably greater than or equal to 0.20 ppm, still more preferably greater than or equal to 0.25 ppm, further preferably greater than or equal to 0.30 ppm, and most preferably greater than or equal to 0.35 ppm. In certain embodiments of the present invention, 2-furfural is present in an amount ranging from 0.10 ppm to 60.0 ppm, preferably 0.15 ppm to 50.0 ppm, more preferably 0.20 ppm to 40.0 ppm, still more preferably 0.25 ppm to 30.0 ppm, further preferably 0.30 ppm to 20.0 ppm, and most preferably 0.35 ppm to 10.0 ppm.

In certain embodiments of the present invention, 2-(5H) furanone is present in an amount greater than or equal to 0.05 ppm, preferably greater than or equal to 0.06 ppm, more preferably greater than or equal to 0.07 ppm, still more preferably greater than or equal to 0.08 ppm, further preferably greater than or equal to 0.09 ppm, and most preferably greater than or equal to 0.10 ppm. In certain embodiments of the present invention, 2-(5H)furanone is present in an amount ranging from 0.05 ppm to 120.0 ppm, preferably 0.06 ppm to 100.0 ppm, more preferably 0.07 ppm to 80.0 ppm, still more preferably 0.08 ppm to 60.0 ppm, further preferably 0.09 ppm to 40.0 ppm, and most preferably 0.10 ppm to 20.0 ppm.

In certain embodiments of the present invention, 2-furfuryl alcohol is present in an amount greater than or equal to 2.5 ppm, preferably greater than or equal to 3.0 ppm, more preferably greater than or equal to 3.5 ppm, still more preferably greater than or equal to 4.0 ppm, further preferably greater than or equal to 4.5 ppm, and most preferably greater than or equal to 5.0 ppm. In certain embodiments of the present invention, 2-furfuryl alcohol is present in an amount ranging from 2.5 ppm to 100.0 ppm, preferably 3.0 ppm to 90.0 ppm, more preferably 3.5 ppm to 80.0 ppm, still more preferably 4.0 ppm to 75.0 ppm, further preferably 4.5 ppm to 50.0 ppm, and most preferably 5.0 ppm to 25.0 ppm.

In certain embodiments of the present invention, dihydro hydroxy maltol is present in an amount greater than or equal to 0.50 ppm, preferably greater than or equal to 0.55 ppm, more preferably greater than or equal to 0.60 ppm, still more preferably greater than or equal to 0.65 ppm, further preferably greater than or equal to 0.70 ppm, and most preferably greater than or equal to 0.75 ppm. In certain embodiments of the present invention, dihydro hydroxy maltol is present in an amount ranging from 0.50 ppm to 10000.0 ppm, preferably 0.55 ppm to 1000.0 ppm, more preferably 0.60 ppm to 500.0 ppm, still more preferably 0.65 ppm to 250.0 ppm, further preferably 0.70 ppm to 100.0 ppm, and most preferably 0.75 ppm to 50.0 ppm.

In certain embodiments of the present invention, 5-hydroxymethyl furfural is present in an amount greater than or equal to 0.05 ppm, preferably greater than or equal to 0.06 ppm, more preferably greater than or equal to 0.07 ppm, still more preferably greater than or equal to 0.08 ppm, further preferably greater than or equal to 0.09 ppm, and most preferably greater than or equal to 0.10 ppm. In certain embodiments of the present invention, 5-hydroxymethyl furfural is present in an amount ranging from 0.05 ppm to 10000.0 ppm, preferably 0.06 ppm to 1000.0 ppm, more preferably 0.07 ppm to 500.0 ppm, still more preferably 0.08 ppm to 250.0 ppm, further preferably 0.09 ppm to 100.0 ppm, and most preferably 0.10 ppm to 50.0 ppm.

Another related aspect of the present invention is directed to a fat-based confection comprising one or more flavor components selected from the group consisting of 2-hydroxy-3-methyl-2-cyclopenten-1-one, 2-acetyl furan, 2-acetyl-3-hydroxyfuran and methyl furanoate. In a preferred embodiment, the fat-based confection further comprises one or more flavor components selected from the group consisting of 2,5-dimethyl-4-hydroxy-3-(2H) furanone, 3-hydroxy-2-methyl-pyran-4-one, 2-furfural, 2-(5H) furanone and 2-furfuryl alcohol. In a more preferred embodiment, the fat based confection further comprises one or more flavor components selected from the group consisting of dihydro hydroxy maltol and 5-hydroxymethyl furfural, as well as one or more flavor components selected from the group consisting of 2,5-dimethyl-4-hydroxy-3-(2H) furanone, 3-hydroxy-2-methyl-pyran-4-one, 2-furfural, 2-(5H)furanone and 2-furfuryl alcohol.

It is within the skill of one of ordinary skill in this art to vary the amounts of all of the above-described thermally generated flavor components to achieve a variety of dulce de leche flavors. Some flavor components may contribute to the dairy flavor of dulce de leche compositions. Varying amounts of the above-noted flavor components will result in dulce de leche flavors having different flavor notes brought to the forefront of the taste profile.

The examples which follow are intended as an illustration of certain preferred embodiments of the invention, and no limitation of the invention is implied.

EXAMPLE 1

Preparation of Dulce De Leche-Flavored Fat-Based Confection

A raw confection was obtained by first combining the ingredients listed in Table 1 in an agitated kettle under low heat, i.e., a 53° C. water-jacketed Hobart A-200FT mixer (Hobart Corp., Troy, Ohio), and then reducing the average particle size of the raw confection to about 25 microns via a Buhler SDX 600 three-roll refiner (Buhler Industries, Uzwil, Switzerland).

TABLE 1

| sucrose | 44.50 w/w % |
|---|---|
| fractionated palm kernel oil | 35 w/w % |
| non-fat dry milk | 20 w/w % |
| lecithin | 0.475 w/w % |
| ethyl vanillin | 0.025 w/w % |

The raw confection was heated to 115° C. and held for 20 minutes using a 120° C. steam-jacketed Contherm 6×6 scraped surface heat exchanger (Alfa Laval Thermal Inc., Newburyport, Mass.). The finished dulce de leche-flavored fat-based confection was cooled to cease the browning reaction and solidify the dulce de leche-flavored fat-based confection. The dulce de leche-flavored fat-based confection had a moisture content of less than 0.70% and a water activity of 0.15.

EXAMPLE 2

Preparation of Candy-Shelled Dulce De Leche-Flavored Fat-Based Confection

A candy-shelled dulce de leche-flavored fat-based confection is acquired by forming the dulce de leche-flavored fat-based confection as obtained in Example 1 into a bite-sized piece. The dulce de leche-flavored fat-based confection can be used alone or in conjunction with other components such as chocolate. The bite-size piece is then candy-shelled such that 25.0% of the finished product constitutes a hard-panned candy shell.

COMPARATIVE EXAMPLE 1

Preparation of Water-Based Dulce De Leche

A traditional water-based dulce de leche was made by placing sealed cans of Nestle®'s Carnation Sweetened Condensed Whole Milk (SCWM) in boiling water for two hours. Then, the heat is turned off, and the SCWM is allowed to slowly cool in the water. After one hour of cooling, the cans of SCWM are removed and air cooled on a wire rack at room temperature. The resulting dulce de leche has a smooth pudding-like texture, a water activity of 0.85 and a moisture content of 26%.

COMPARATIVE EXAMPLE 2

Preparation of Water-Based Caramel

A water-based caramel was obtained by first combining the ingredients listed in Table 2 to form a raw caramel.

TABLE 2

| sucrose | 15–40 w/w % |
|---|---|
| corn syrup | 15–60 w/w % |
| heavy cream | 10–20 w/w % |
| butter | 3–5 w/w % |
| sweetened condensed milk | 20–40 w/w % |
| salt | 0.10 w/w % |
| ethyl vanillin | 0.03 w/w % |

The raw caramel was heated in a scraped surface heat exchange apparatus. In an evaporation step, water was flashed off and then browning or caramelization was accomplished in a jacketed vessel under high heat. The finished water-based caramel had a moisture content of between 5.0–12.0% and a typical water activity of 0.4–0.65.

Sensory Testing

Descriptive sensory analysis of the dulce de leche-flavored fat-based confection of Example 1, the water-based dulce de leche of Comparative Example 1, Hershey Classic Caramels, Kraft Caramels and Caramac® has been conducted. All samples were evaluated by trained taste testers using the Spectrum Method; this method uses the Universal Aromatic Scale to capture intensities of flavors in a given sample. The flavor profiles of the dulce de leche-flavored fat-based confection of the present invention and water-based dulce de leche were the same; both samples were described as having a main dairy character with a lower caramelized sugar flavor. On the other hand, both Hershey Classic Caramels and Kraft Caramels were described as having a main character of caramelized sugar and vanilla with a lower dairy flavor and underlying buttery flavor. Caramac® was described as having a dairy character with low vanilla and caramelized sugar flavors, a flavor that was much more similar to a traditional caramel flavor than to a dulce de leche flavor.

Further, candy-shelled samples of the dulce de leche-flavored fat-based confection of the present invention obtained superior consumer scores and a strong preference, as compared with candy-shelled samples of traditional water-based caramel. Additional descriptive sensory analysis of candy-shelled samples of the dulce de leche-flavored fat-based confection of the present invention, as compared with candy-shelled samples of traditional water-based caramel, has also been conducted.

Analytical Testing

Analysis of the dulce de leche-flavored fat-based confection of Example 1, water-based caramels from Snickers and Milky Way, and the water-based dulce de leche of Comparative Example 1 has determined water activities and moisture contents as set forth in Table 3 below. The water activities were determined using a Rotronic Hygroskop DT at 25° C. using 0.10–0.95 RH standards. The moisture contents were determined using an Orion Turbo 2 using the blending Karl Fisher technique.

TABLE 3

Water activity and moisture content.

| | water activity | % water |
|---|---|---|
| Snickers | 0.50 | 11.5 |
| Milky Way | 0.50 | 11.5 |
| Comparative Example 1 | 0.85 | 26 |
| Example 1 | 0.15 | 0.70 |

As can be seen from Table 3, the dulce de leche-flavored fat-based confection of the present invention has a much lower moisture content and water activity than any of the other tested materials. The ultra-low moisture and ultra-low water activity of the dulce de leche-flavored fat-based confection of the present invention render it particularly suitable for applications in which moisture has been problematic, e.g., in combination with other low moisture ingredients, candy shelling, etc.

Analysis of the dulce de leche-flavored fat-based confection of Example 1 and Caramac® by gas chromatograph/mass spectrometry has identified flavor compounds as set forth in Table 4 below. This analysis involved two basic steps: extraction and identification.

The extraction conditions and technique was identical for both the dulce de leche-flavored fat-based confection and Caramac®. Each sample (72.90 g) was frozen with liquid nitrogen and subsequently ground. The sample was then mixed with 100 ml saturated NaCl solution at 50° C. and shaken for 20 minutes with an autoshaker. The resulting solution was then spiked with an internal standard of 2-isobutylthiazole (113.6 ppm), and 75 ml re-distilled ether was added. The resulting solution was then shaken for another 20 minutes (autoshaker) and centrifuged at 3500 rpm for 10 minutes. Then the ether layer extract was decanted via Solvent Assisted Flavor Evaporation (SAFE) technique (Baeng Corp., Manching, Germany). SAFE conditions were high vacuum ($3.2 \times 10^{-5}$ mbar) for 2 hours. The extract was concentrated using a Vigreux column in a 50° C. water bath until a final volume of 250 ml was achieved.

Identification of the flavor compounds was accomplished using an Agilent 6890 gas chromatograph coupled to a Quadrapole Agilent 5973 mass spectrometer. Analysis of the volatile extract concentrates was accomplished using the following parameters: Carrier Gas: helium 36 cm/sec, 6.73 psi (35° C.), 1.0 ml/minute constant flow; Separation Column: HP-FFAP 30 m×0.25 mm×0.25 µm; Injection: split (10:1), 1 µl of the sample distillate, Gerstel MPS2, inlet temperature of 250° C.; Oven Profile: 35° C., 1 minute hold; 35° C.–60° C. at 60° C./minute; 60° C. –230° C. at 6° C./minute; 230° C. hold 10 minutes; Detector: Agilent 5973 MSD, 70 ev, 35–350 amu scan on negative ion mode.

TABLE 4

Flavor compounds.

| flavor compound | amount (ppm) in Example 1 | amount (ppm) in Caramac ® |
|---|---|---|
| 2-furfural | 0.62 | 0.07 |
| 2-acetyl furan | 0.20 | ND |
| 2-acetyl-3-hydroxyfuran | 0.20 | ND |
| 2-furfuryl alcohol | 6.16 | 2.15 |
| 2-(5H)furanone | 0.12 | 0.04 |
| 2-hydroxy-3-methyl-2-cyclopenten-1-one | 0.02 | ND |
| 3-hydroxy-2-methyl-pyran-4-one | 12.18 | 4.83 |
| methyl furanoate | 0.63 | ND |
| 2,5-dimethyl-4-hydroxy-3-(2H)furanone | 0.38 | 0.12 |
| dihydro hydroxy maltol | 1.02 | 0.48 |
| 5-hydroxymethyl furfural | 0.15 | 0.04 |
| vanillin | ND | 19.57 |

*ND = not detected

As can be seen from Table 4, the dulce de leche-flavored fat-based confection of the present invention has a set of flavor compounds distinct from those of Caramac®. These finding are consistent with the sensory testing described above.

From a flavor chemistry perspective, the absence of 2-acetyl furan, 2-acetyl-3-hydroxyfuran, 2-hydroxy-3-methyl-2-cyclopenten-1-one and methyl furanoate from Caramac® has a significant impact on the overall taste of Caramac® as compared with the overall taste of the inventive dulce de leche-flavored fat-based confection; these compounds would appear to be responsible, at least in part, for the distinct rich dairy flavor (as discussed above) of the inventive confection. Similarly, the absence of vanillin flavor compound from the dulce de leche-flavored fat-based confection of the present invention is significant; those flavor compounds may, in part, be responsible for the vanilla flavor (as discussed above), which render Caramac® more similar in flavor to a traditional caramel than to a dulce de leche composition.

Further, the significantly higher amounts of 2-furfural, 2-furfuryl alcohol, 3-hydroxy-2-methyl-pyran-4-one and 2,5-dimethyl-4-hydroxy-3-(2H)furanone in the dulce de leche-flavored fat-based confection of the present invention would appear to also be responsible, at least in part, for the distinct rich dairy flavor (as discussed above) of the inventive confection.

Other variations and modifications of this invention will be obvious to those skilled in this art. This invention is not to be limited except as set forth in the following claims.

What is claimed is:

1. A method of making a dulce de leche-flavored fat-based confection comprising the steps of:
   dispersing a sweetener and a dairy protein in a fat to form a raw confection having a fat continuous phase;

heating the raw confection within a temperature range and for a time sufficient to thermally generate a dulce de leche flavor, thereby forming the dulce de leche-flavored fat-based confection; and cooling the dulce de leche-flavored fat-based confection to a temperature sufficient to halt the thermal generation of dulce de leche flavor, wherein the moisture content of the dulce de leche-flavored fat-based confection is less than about 5% by weight of the confection.

2. The method according to claim 1 further comprising the step of reducing an average particle size of the raw confection.

3. The method according to claim 2, wherein the average particle size is reduced to 1 to 100 microns.

4. The method according to claim 1 further comprising the step of reducing an average particle size of the dulce de leche-flavored fat-based confection.

5. The method according to claim 4, wherein the average particle size is reduced to 1 to 100 microns.

6. The method according to claim 1, wherein the raw confection is heated within the temperature range between 70° C. and 180° C.

7. The method according to claim 1, wherein the time sufficient to develop a dulce de leche flavor is between 1 minute and 1440 minutes.

8. The method according to claim 1, wherein the temperature sufficient to halt the development of dulce de leche flavor is below 70° C.

9. A dulce de leche-flavored fat-based confection comprising a sweetener; a dairy protein; and a fat continuous phase, said confection having a smooth and creamy mouthfeel and being made according to a process comprising the steps of:

dispersing the sweetener and the dairy protein in a fat to form a raw confection having the fat continuous phase;

heating the raw confection within a temperature range and for a time sufficient to thermally generate dulce de leche flavor, thereby forming the dulce de leche-flavored fat-based confection; and cooling the dulce de leche-flavored fat-based confection to a temperature sufficient to halt the thermal generation of dulce de leche flavor and to solidify the dulce de leche-flavored fat-based confection, wherein the moisture content of the dulce de leche-flavored fat-based confection is less than about 5% by weight of the confection.

10. The method according to claim 1, wherein the dulce de leche-flavored fat-based confection comprises a fat in an amount ranging from 10.0% to 98.0% by weight of the dulce de leche-flavored fat-based confection.

11. The dulce de leche-flavored fat-based confection according to claim 9, wherein the dulce de leche-flavored fat-based confection comprises a fat in an amount ranging from 10.0% to 98.0% by weight of the dulce de leche-flavored fat-based confection.

* * * * *